Nov. 23, 1965　　　J. R. CUNNINGHAM　　　3,218,674

COTTON GIN

Filed Sept. 12, 1963

INVENTOR.
John R. Cunningham
BY
Jennings, Carter & Thompson
Attorneys

United States Patent Office 3,218,674
Patented Nov. 23, 1965

3,218,674
COTTON GIN
John R. Cunningham, P.O. Box 1028, Greenwood, Miss.
Filed Sept. 12, 1963, Ser. No. 308,443
8 Claims. (Cl. 19—50)

This invention relates to a cotton gin and more particularly to a roller type gin in which cotton fibers are separated from the seed by a gentle action, thereby minimizing damage to the fibers.

An object of my invention is to provide a cotton gin of the character designated in which the seed cotton is not fed directly against a pair of moving members, thereby eliminating damage to the seed as the fibers are separated therefrom.

Another object of my invention is to provide a cotton gin of the character designated in which the fibers are pulled from the seed by an endless belt which cooperates with a ginning roller wherein the bite between the belt and the roller is reduced to a minimum, thus permitting the seed to move relatively close to the bite without actually contacting the endless belt.

Another object of my invention is to provide a cotton gin of the character designated which shall require a minimum of moving parts.

A further object of my invention is to provide a cotton gin of the character designated which shall be simple of construction, economical of manufacture and one which may be adjusted to accommodate seed cotton having various length fibers.

Heretofore in the art to which my invention relates, various roller type gins have been proposed; however, such devices have been unsatisfactory due to the fact that the seed cotton comes into contact with both of the rotatable members whereby the seeds are crushed or damaged as the fibers are removed therefrom. Also, no effective means has been provided for supporting the seed in proper relation to the moving elements whereby the fibers are readily removed therefrom in an efficient manner.

To overcome the above and other difficulties, I provide a cotton gin in which the seed cotton is supported in a longitudinally extending groove provided in a plate-like member adjacent the surface of a ginning roller. The plate-like member is spaced from the adjacent surface of the ginning roller a distance slightly less than the minimum dimension of the seed to be separated. An endless belt member is mounted adjacent the plate-like member in position to engage the ginning roller whereby the fibers which move inwardly between the plate-like member and the ginning roller are engaged by the endless belt and the ginning roller to thereby remove the lint from the seed.

Figure 1:
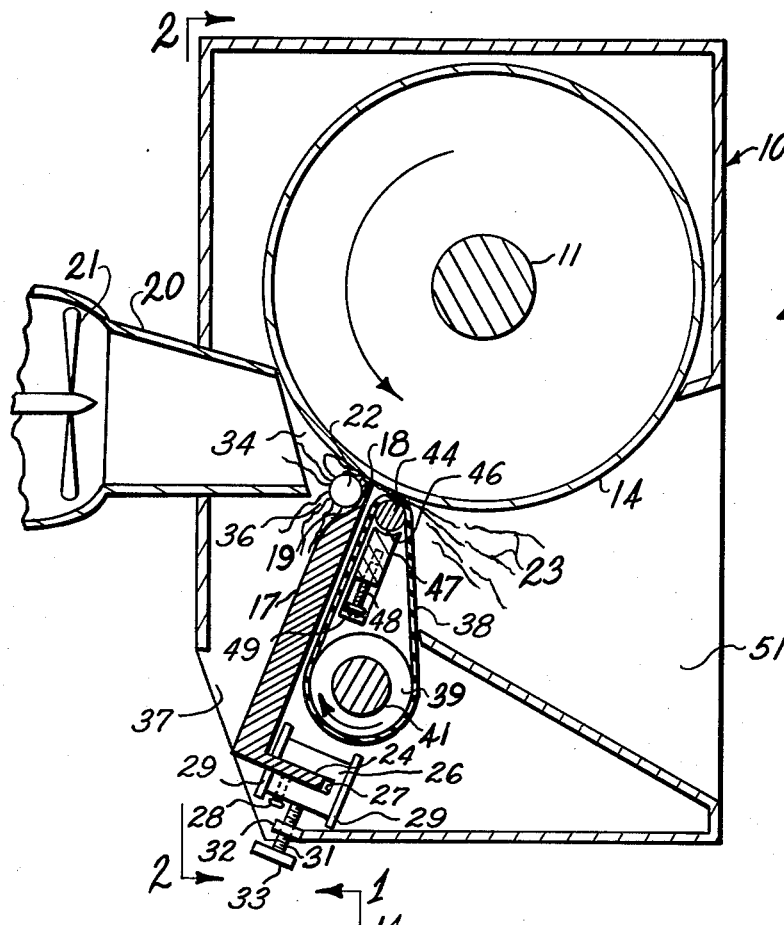
Figure 2:
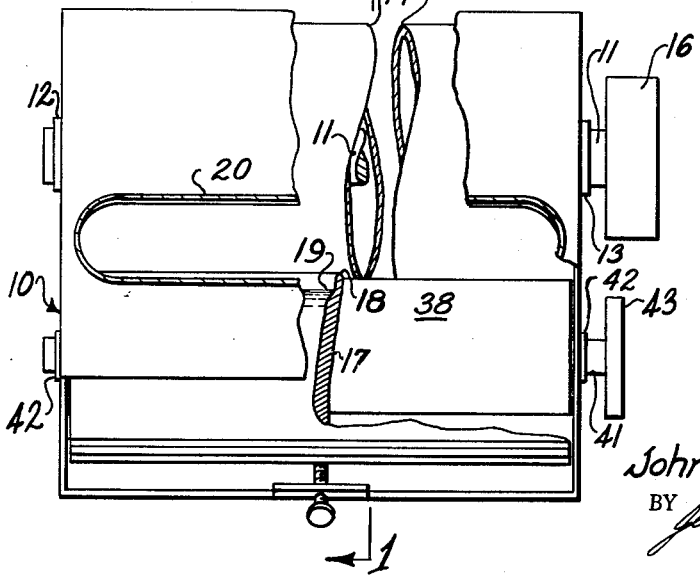

Apparatus embodying features of my invention is illustrated in the accompanying drawing, forming a part of this application, in which:

FIG. 1 is a vertical sectional view taken generally along the line 1—1 of FIG. 2; and, FIG. 2 is a sectional view taken generally along the line 2—2 of FIG. 1 drawn to a smaller scale and partly broken away.

Referring now to the drawing for a better understanding of my invention, I show a supporting frame 10. Extending transversely within the frame 10 is a shaft 11 which is mounted for rotation in suitable bearings 12 and 13, as shown in FIG. 2. Secured to the shaft 11 and adapted to rotate therewith within the frame 10 is a ginning roller 14. The shaft 11 is driven by suitable means, such as a pulley 16 which is operatively connected to a suitable source of power, not shown.

Mounted within the frame 10 adjacent one side of the ginning roller 14 is a plate-like member 17 which defines with the adjacent surface of the ginning roller 14 an obtuse angle, as shown. The end of the plate-like member 17 adjacent the ginning roller 14 is spaced from the outer surface of the ginning roller a distance slightly less than the minimum dimension of the seed to be separated. As shown in FIGS. 1 and 2, the end of the plate-like member 17 adjacent the ginning roller 14 is reduced in thickness as at 18 to define a longitudinally extending trough 19 adjacent the ginning roller 14 for receiving seed cotton whereby the seeds 22 thereof are positioned closely adjacent the ginning roll 14 as the lint indicated at 23 is removed therefrom. The seed cotton is introduced into the trough 19 by a conduit 20. A suitable blower 21 may be provided in the conduit 20 to aid in the introduction of the seed cotton.

The plate 17 is supported by suitable means, such as by providing a laterally projecting bracket 24 thereon which is adapted to be connected adjustably to a transverse support member 26. An upwardly opening slot 27 is provided in the transverse support member 26 for receiving the laterally projecting bracket 24 and a set screw 28 holds the bracket 24 in selected positions whereby the position of the plate 17 may be adjusted. The transverse support member 26 rides in suitable guideways 29 carried by opposite sides of the frame 10 whereby the support member 26 may be moved to selected positions. Operatively connected to the transverse support member 26 and adapted for rotation relative thereto is an actuating member 31 which is in threaded engagement with an internally threaded member 32 carried by the frame 10. An operating handle 33 is carried by the member 31 whereby it may be rotated to thus position the transverse support member 26 and the plate 17 at selected positions relative to the ginning roll 14.

It will thus be seen that the groove 19 in the plate 17 and the adjacent surface of the ginning roll 14 define a chamber for receiving the seed cotton. Suitable end walls 34 are provided for the seed cotton chamber.

The inner end of the conduit 20 is spaced from the adjacent portion of the plate 17 a distance to permit delinted seeds 22 to pass therebetween. On the other hand, a seed 22 having lint thereon will not pass between the inner end of the conduit 20 and the plate 17. A passageway 36 is thus provided between the conduit 20 and the plate 17 for discharging delinted seed. The seed are then removed from the apparatus through an outlet 37, as shown in FIG. 1.

Mounted for rotation adjacent the plate 17 is an endless belt 38 which is supported and driven at one end thereof by a transverse roller 39 which is secured to a shaft 41. The transverse shaft 41 is supported by suitable bearings 42 carried by the frame 10 and is driven by suitable means, such as a pulley 43 which in turn is operatively connected to a suitable source of power, not shown. The other end of the endless belt 38 is rotatably supported by a small diameter roller 44 which is supported in an arcuate recess 46 provided in a transverse bar 47. By providing a relatively small diameter roller 44, the bite between the endless belt 38 and the ginning roll 14 is positioned relatively close to the innermost edge of the plate 17, thereby adapting the apparatus for engaging cotton fibers which are relatively short in length. The transverse bar 47 is adapted for adjustment toward and away from the ginning roller 14 by suitable adjusting screws 48 which are supported by internally threaded brackets 49 carried by the frame 10 adjacent opposite ends of the transverse bar 47. By providing means for adjusting the position of the transverse bar 47 and the roller 44 relative to the ginning roll 14, the tension of the endless belt 38 may be controlled as well as the pressures imparted against the ginning roll 14 by the endless belt. Preferably, the belt 38 is formed of a rubber-like material.

A suitable lint receiving chamber 51 is provided at the discharge side of the endless belt 38 and the adjacent portion of the ginning roll 14, as shown in FIG. 1. The lint receiving chamber 51 may be connected to a suitable container for collecting the lint.

From the foregoing description, the operation of my improved apparatus will be readily understood. The seed cotton is introduced through conduit 20 into the elongated trough 19 defined between the plate 17 and the adjacent surface of the ginning roll 14 and rotary motion is imparted to the ginning roll 14 and the endless belt 38. The surface friction of the rotating ginning roll 14 carries the fibers 23 through the gap defined between the reduced thickness portion 18 of the plate 17 and the adjacent surface of the ginning roll 14. The depending fibers 23 are then engaged by the endless belt 38 whereupon they are pulled inwardly by the endless belt 38 and the ginning roll 14. By providing means for adjusting the plate 17 toward and away from the ginning roll 14, the opening between the plate 17 and the gininng roll 14 may be varied. Preferably, the opening is of a size slightly less than the size of the seed being separated, whereby the lint 23 is free to move through the opening to the bite between the endless belt 38 and the ginning roll 14. Also, by providing means for adjusting the elevation of the plate 17 relative to the endless belt 38, the distance between the reduced thickness portion 18 and the adjacent end of the endless belt 38 may be adjusted to accommodate fibers of different lengths. Also, by providing for adjustment of the transverse bar 47 toward and away from the ginning roll 14, the tension on the endless belt may be varied and at the same time the pressure exerted against the ginning roll by the endless belt may be varied.

After the seed 22 have been delinted, they move downwardly through the passageway 36 and then outwardly through the discharge opening 37 to a suitable container therefor.

From the foregoing, it will be seen that I have devised an improved cotton gin which separates the fibers from the seed with a minimum of effort and with a gentle action whereby the fibers are not damaged in any manner as they are separated from the seed. By providing a longitudinally extending trough which supports the seed cotton in spaced relation to the cooperating rotatable elements 38 and 14, the seeds are not crushed by the rotatable elements and at the same time the fibers are removed therefrom. Also, by providing means for removing the seed immediately upon being delinted, the delinted seed do not interfere with the ginning operation. Furthermore, by providing a cotton gin which embodies a minimum of rotating parts, my improved apparatus is trouble-free in operation and requires a minimum of maintenance.

While I have shown my invention in but one form, it will be obvious to those skilled in the art that it is not so limited, but is susceptible of various changes and modifications without departing from the spirit thereof, and I desire, therefore, that only such limitations shall be placed hereupon as are specifically set forth in the appended claims.

What I claim is:

1. Apparatus for separating seed from seed cotton comprising:
   (a) a horizontally extending ginning roller,
   (b) a plate-like member mounted adjacent said ginning roller and defining with the adjacent surface of said ginning roller an obtuse included angle and a seed cotton receiving trough,
   (c) the innermost end of said plate-like member being spaced from the outer surface of said ginning roller a distance slightly less than the minimum dimension of the seed to be separated to restrain movement of the seed past said plate-like member,
   (d) an endless belt mounted for rotation adjacent the opposite side of said plate-like member from the cotton receiving trough in position to engage the adjacent surface of said ginning roller,
   (e) means rotating said ginning roller and said endless belt in a direction for adjacent surfaces of said ginning roller and said endless belt to move in the same direction to engage and pull therebetween the cotton fibers which move inwardly between said plate-like member and the ginning roller to thus separate the fibers from the seed while the seed are held in spaced relation to said endless belt by said plate-like member, and
   (f) there being a discharge passageway adjacent said plate-like member to remove the seed from said trough continuously as they are separated from the lint.

2. Apparatus for separating seed from seed cotton as defined in claim 1 in which the plate-like member is mounted for adjustment toward and away from said ginning roller whereby the space between said plate-like member and said ginning roller can be varied.

3. Apparatus for separating seed from seed cotton as defined in claim 1 in which the plate-like member is mounted for adjustment toward and away from said endless belt whereby the apparatus is adapted to accommodate fibers of different lengths.

4. Apparatus for separating seed from seed cotton as defined in claim 1 in which the thickness of said plate-like member is reduced adjacent the ginning roller to retain the seed adjacent the ginning roller as the fibers are separated therefrom.

5. Apparatus for separating seed from seed cotton as defined in claim 1 in which the endless belt is formed of a resilient rubber-like material.

6. Apparatus for separating seed from seed cotton as defined in claim 1 in which the end of the endless belt adjacent the ginning roller passes around a small diameter roller.

7. Apparatus for separating seed from seed cotton comprising:
   (a) a horizontally extending ginning roller,
   (b) a plate-like member mounted adjacent said ginning roller and defining with the adjacent surface of said ginning roller an obtuse included angle and a seed cotton receiving trough,
   (c) the innermost end of said plate-like member being spaced from the outer surface of said ginning roller a distance slightly less than the minimum dimension of the seed to be separated,
   (d) an endless belt mounted for rotation adjacent said plate-like member in position to engage the adjacent surface of said ginning roller,
   (e) a small diameter roller mounted within the confines of said endless belt in position to support one end of said endless belt adjacent the ginning roller,
   (f) a support member extending transversely and within the confines of said endless belt adjacent said small diameter roller,
   (g) there being a longitudinally extending arcuate recess in said support member adjacent said small diameter roller for receiving the adjacent surface of said small diameter roller,
   (h) means rotating said ginning roller and said endless belt in a direction for adjacent surfaces of said ginning roller and said endless belt to move in the same direction whereby cotton fibers move inwardly between said plate-like member and the ginning roller and are then pulled between said ginning roller and said endless belt to separate the fibers from the seed, and (i) there being a discharge passageway adjacent said plate-like member to remove the seed from said trough continuously as they are separated from the lint.

8. Apparatus for separating seed from seed cotton as defined in claim 7 in which the support member is mounted for adjustment relative to the ginning roller whereby the tension of the endless belt may be varied.

References Cited by the Examiner
UNITED STATES PATENTS

| | | | |
|---|---|---|---|
| 869,633 | 10/1907 | Hodgkinson | 19—50 |
| 1,157,720 | 10/1915 | Pearse | 19—52 X |
| 1,408,343 | 2/1922 | Conway | 19—51 |
| 1,503,077 | 7/1924 | Townsend | 19—50 X |

DONALD W. PARKER, *Primary Examiner.*